Jan. 10, 1928.

H. A. SÉVIGNÉ

1,655,634

MACHINE FOR WRAPPING AND SEALING ARTICLES

Filed Oct. 21, 1926

Inventor:
Henri A. Sévigné
by N. W. Harrison
Atty.

Patented Jan. 10, 1928.

1,655,634

UNITED STATES PATENT OFFICE.

HENRI A. SÉVIGNÉ, OF WINTHROP, MASSACHUSETTS, ASSIGNOR TO NATIONAL BREAD WRAPPING MACHINE COMPANY, OF BOSTON, MASSACHUSETTS, A CORPORATION OF MASSACHUSETTS.

MACHINE FOR WRAPPING AND SEALING ARTICLES.

Application filed October 21, 1926. Serial No. 143,273.

This invention relates to the wrapping of articles such as loaves of bread in waxed paper, and has particular reference to effecting the sealing together of overlapping portions of the paper.

As is well known, many articles are wrapped in paper which carries sufficient wax, such as paraffine, so that when the overlapping portions or flaps pass in contact with heated surfaces and then in contact with cool surfaces, the wax is first melted so as to form practically single layers of wax between all such heated overlapping portions, such layers then hardening or congealing when cooled, resulting in sealing the packages.

In machines such as illustrated in Letters Patent No. 1,412,754, granted April 11, 1922, on an application filed by Sévigné & Arnold, the wrapped articles, after passing in contact with heating plates, are pushed over a table or belt which is of sufficient length to enable the melted wax to cool and harden before the articles are delivered therefrom. Sometimes the cooling table or belt, after a considerable run of the machine at high speed, becomes too warm to effect perfect sealing of the packages. And usually the table or belt requires about as much longitudinal space as all of the rest of the machine.

One of the objects of the present invention is to reduce the time required to effect the cooling and hardening of the wax, and another object is to reduce the amount of floor space occupied by the machine as a whole. I attain these objects by causing those portions of the wrappers which have been subjected to heat to be immediately subjected to the action of cool liquid.

With said objects in view, the invention consists in the method and the construction and combination of parts substantially as hereinafter described and claimed.

Of the accompanying drawings.

Similar reference characters indicate similar parts in all of the views.

Figure 1:
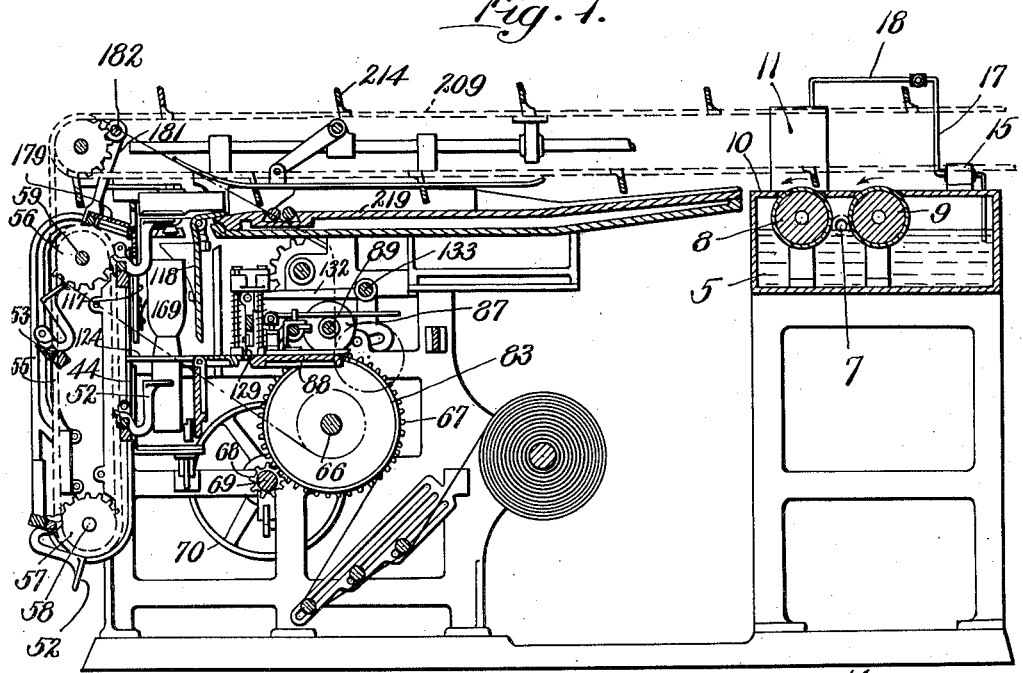
Figure 1 represents a longitudinal section of a wrapping machine of the character shown in the above-mentioned patent but illustrating my present improvements.

Referring first to the parts of the machine which are substantially the same as in the patent referred to, the articles to be wrapped, such as loaves of bread, are singly and successively introduced into the lower part of a vertical chute or passageway one wall of which is indicated at 44, and each article is carried up through said chute by lifting fingers 52 which are secured to rods 53 carried by endless chains 55 running over sprockets 56, 57, mounted on shafts 58, 59.

A shaft 66 having a gear 67 meshing with a pinion 68 carried by shaft 69 having a belt-driving pulley 70, is driven continuously when the machine is in operation. A drum 83 is carried by the shaft 66 and the paper which is to be cut into wrapper sections is intermittently pushed over the bed 88 to position over each rising loaf in the chute, by the cooperation with said drum of a roll or series of rolls 87 carried by a shaft 89. By suitable mechanism such as illustrated in the above-mentioned patent, the shaft 89 is raised and lowered at proper intervals so as to feed the web of paper between them when, and during the time that, the lower position of the said shaft causes the roll or rolls 87 to press the web into contact with the continuously rotating drum 83.

The paper is pushed out over fingers or extensions 124 of the bed 88 and a section is cut off by a vertically movable knife 129 operated by arms 132 of a rock shaft 133 and said section is draped over a rising loaf passing up between a rigid wall 117 and a yielding wall 118 and said section is further folded at 169. At the top of the chute a flap of the partly folded wrapper section is acted upon by a tucker 179 carried by arms 181 of a rock shaft 182, and then the wrapped loaf is pushed over the horizontal sealing table 219 by pushers 214 carried by endless chains 209.

As explained in the patent hereinbefore referred to, the wax carried by the overlapping flaps or folds of the wrappers is melted after the articles are wrapped and while they are being carried along the table 219 by the pushers 214; and as the structure and operation of the folding machine as a whole are fully illustrated and explained in said patent, no further explanation thereof is needed herein, especially in view of the fact that so far as concerns the invention claimed herein and which will now be explained, such structure and operation may be of different character.

From the sealing table 219 the wrapped articles are caused by the pushers 214 to successively travel in contact with a cool liquid applier or appliers, a suitable type of which is illustrated in the accompanying drawings.

Supported by a suitable portion of the frame of the machine is a tank 5 having a water-supply inlet 6 and an outlet 7 which latter may be at a height to determine the level of water in the tank.

Mounted in suitable bearings are horizontal rolls 8, 9, preferably having absorbent coverings such as felt, the upper portions thereof rising slightly through slots or openings in the cover 10 which provides a table or surface over which the loaves are transported by the pushers 214 to any suitable delivery portion of the machine, the overlapping flaps at the bottom of each loaf being immediately chilled by the cold water applied thereto by the horizontal rolls, the melted wax carried by said flaps being almost instantly set or hardened.

Figure 2:
Figure 2 is a plan view of the parts shown at the right of Figure 1.
Figure 3:
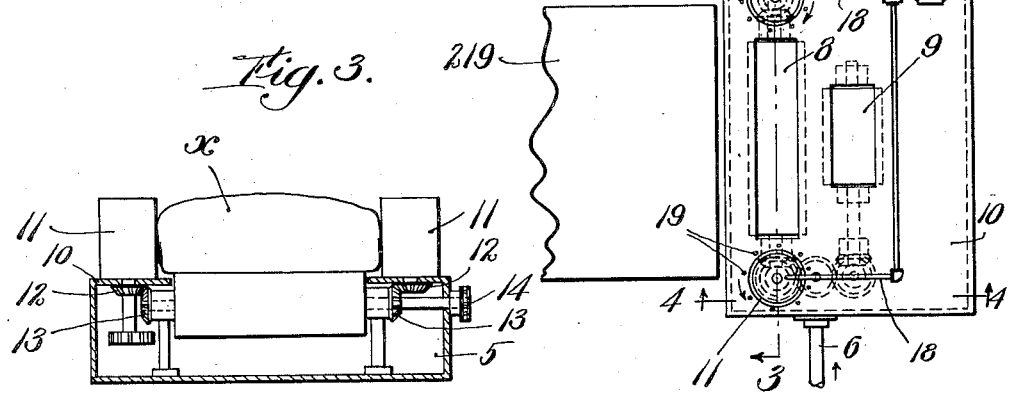
Figure 3 represents a section on line 3—3 of Figure 2.
Figure 4:
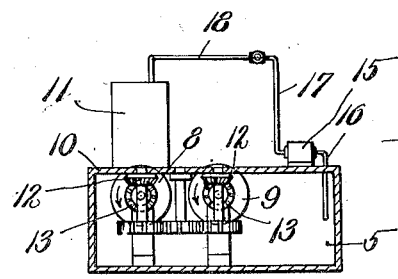
Figure 4 represents a section on line 4—4 of Figure 2.

To act in a similar manner on the overlapping flaps at the ends of the loaves, I provide suitably mounted vertical rolls 11, also preferably having coverings of absorbent material, and having their shafts provided with bevel pinions 12 meshing with bevel pinions 13 at the ends of the shaft of roll 8 (Fig. 3). Said shaft of roll 8 is illustrated as extending through a wall of the tank 5 and having a sprocket 14 for a drive chain. By other gearing such as illustrated but not necessary to describe in detail, the roll 9 is driven in the same direction as the roll 8, the direction of both being illustrated by arrows in Figure 1. Any suitable means may be employed for keeping the vertical rolls supplied with water. For such purpose the drawings illustrate a pump 15 having an inlet pipe 16 through which water may be drawn from the tank 5, and an outlet pipe 17 connected to branch piping 18 having terminals or nozzles in position to deliver water onto the tops of the rolls 11. Surplus water from the rolls 11 may return to the tank 5 through small holes in the cover 10, as indicated at 19 in Figure 2.

When a wrapped loaf such as indicated at X in Figure 3 is pushed over the horizontal rolls and between the vertical rolls, the bottom flaps and the end portions of the wrapper which are carrying melted wax have cool liquid applied thereto by surfaces which are moving in a direction opposite to the direction of movement of the loaf. The chilling action of the cool liquid quickly sets or hardens the wax and renders the sealing permanent while the loaf is travelling a very short distance. Therefore the machine as a whole requires much less space longitudinally than a machine such as illustrated in the patent before referred to.

The result of causing the cooling surfaces to travel in a direction opposite to the direction of movement of the loaf instead of with and at the same speed as the loaf, is to reduce liability of any crystals of the wax adhering to the cooling surfaces, and to lessen the absorption of heat by the cooling surfaces from the hot wax on the wrappers.

While I have illustrated a short roll 9 in addition to the longer roll 8, I do not limit myself thereto as a single roll is usually sufficient to effect complete cooling. And while each of the cool-liquid appliers 8, 9 and 11 is so formed that its wet surface travels circularly because said surface is carried by a cylindrical roll, it is to be understood that short endless belts might be substituted for the rolls without departing from my invention.

Ordinarily the water or other cooling liquid employed may be only naturally cool or, in other words, at normal temperature, but it may be artificially chilled under some circumstances.

Having now described my invention, I claim:—

1. Mechanism for effecting the sealing of waxed paper wrappers on articles, consisting of means for heating overlapping portions of the wrappers, a cool liquid applier, means for causing the wrapped articles to travel in a direction to contact with the heating means and then with the cool liquid applier, and means for causing the liquid applier to travel in a direction opposite to the direction of travel of the wrapped articles.

2. A wrapping machine having means for causing the wrapped articles to travel in contact with heating elements and then in contact with wiping surfaces, means for causing said wiping surfaces to move in a direction opposite to the direction of travel of the wrapped articles, and means for keeping said wiping surfaces in a wet condition.

3. A bread wrapping machine having heating elements to act on portions of the wrappers on the loaves, rolls in position for the wrapped loaves to pass in contact therewith, said rolls having absorbent surfaces, means for keeping said surfaces supplied with cool liquid, means for causing the wrapped loaves to contact first with the heating elements and then with the surfaces of the rolls, and means for rotating the rolls in a direction to effect a backward wiping action on the moving wrapped loaves.

4. A wrapping machine having means for causing the wrapped articles to travel in contact with heating elements and then in contact with wiping surfaces, said wiping surfaces comprising rolls in position to act on both ends and on the bottom of each wrapped article, means for keeping said rolls in a wet condition, and means for rotating the rolls in a direction to effect a backward wiping action on the wrapped articles.

In testimony whereof I have affixed my signature.

HENRI A. SÉVIGNÉ.